(12) United States Patent
Smith

(10) Patent No.: US 10,405,487 B2
(45) Date of Patent: Sep. 10, 2019

(54) MULCHING MOWER UNIT

(71) Applicant: KUBOTA CORPORATION, Osaka (JP)

(72) Inventor: Phillip Smith, Gainesville, GA (US)

(73) Assignee: KUBOTA CORPORATION, Osaka (JP)

( * ) Notice: Subject to any disclaimer, the term of this patent is extended or adjusted under 35 U.S.C. 154(b) by 1 day.

(21) Appl. No.: 15/347,133

(22) Filed: Nov. 9, 2016

(65) Prior Publication Data

US 2018/0125004 A1    May 10, 2018

(51) Int. Cl.
*A01D 34/00*    (2006.01)

(52) U.S. Cl.
CPC .................................. *A01D 34/005* (2013.01)

(58) Field of Classification Search
CPC ...... A01D 34/667; A01D 34/71; A01D 34/81; A01D 34/005; A01D 34/412; A01D 34/63
USPC ....................................................... 56/320.2
See application file for complete search history.

(56) References Cited

U.S. PATENT DOCUMENTS

| | | | | |
|---|---|---|---|---|
| 2,791,080 A | * | 5/1957 | Shaw | A01D 34/71 56/13.8 |
| 3,002,331 A | * | 10/1961 | Denney | A01D 34/63 56/13.4 |
| 3,134,212 A | * | 5/1964 | Gary | A01D 42/005 56/16.4 R |
| 3,574,272 A | * | 4/1971 | Krewson | A01D 34/63 55/380 |
| RE29,139 E | * | 2/1977 | Messner | A01D 42/00 15/328 |
| 4,189,903 A | * | 2/1980 | Jackson | A01D 34/005 56/17.5 |
| 5,133,176 A | | 7/1992 | Baumann et al. | |
| 5,191,756 A | * | 3/1993 | Kuhn | A01D 34/005 56/13.4 |
| 5,210,998 A | * | 5/1993 | Hojo | A01D 34/005 56/255 |
| 5,212,938 A | * | 5/1993 | Zenner | A01D 34/005 56/17.5 |
| 5,267,429 A | * | 12/1993 | Kettler | A01D 34/005 56/295 |
| 5,457,947 A | * | 10/1995 | Samejima | A01D 34/005 56/16.7 |
| 5,465,564 A | * | 11/1995 | Koehn | A01D 34/005 56/13.6 |

(Continued)

FOREIGN PATENT DOCUMENTS

GB    849915 A    * 9/1960 ............. A01D 34/71

*Primary Examiner* — Thomas B Will
*Assistant Examiner* — Joan D Misa
(74) *Attorney, Agent, or Firm* — Greenblum & Bernstein, P.L.C.

(57) ABSTRACT

A mulching mower unit includes a mower deck, a rotary shaft, a blade, a shroud, and a deflector plate. The shroud has a circumferential wall including a rotational trajectory of the blade, and extends downward from a bottom surface of the mower deck to an area adjacent to the blade. The deflector plate is provided above the blade and radially outward of the rotary shaft in a running direction in an inner space of the shroud. The deflector plate includes a main body having an inner edge facing the rotary shaft and an outer edge spaced apart from the inner edge radially outward of the rotary shaft. The outer edge is positioned closer to the ground than the inner edge.

9 Claims, 3 Drawing Sheets

(56) References Cited

U.S. PATENT DOCUMENTS

| | | | | |
|---|---|---|---|---|
| 5,483,790 A * | 1/1996 | Kuhn | ............... | A01D 34/005 56/17.5 |
| 5,628,171 A * | 5/1997 | Stewart | ............... | A01D 42/005 56/2 |
| 5,765,346 A * | 6/1998 | Benter | ............... | A01D 34/005 56/17.4 |
| 6,189,307 B1 * | 2/2001 | Buss | ............... | A01D 34/001 56/2 |
| 6,470,663 B2 * | 10/2002 | Langworthy | ............... | A01D 34/71 56/320.2 |
| 7,299,613 B2 * | 11/2007 | Samejima | ............... | A01D 34/005 56/320.1 |
| 8,127,522 B2 * | 3/2012 | Campbell | ............... | A01D 42/005 56/320.2 |
| 2009/0178382 A1 * | 7/2009 | Sugio | ............... | A01D 34/005 56/320.2 |

* cited by examiner

MULCHING MOWER UNIT

TECHNICAL FILED OF INVENTION

The present application relates to a mulching mower unit including a mower deck, and at least one blade housed in the mower deck to cut grass clippings which accumulates in the mower deck and drop the cut grass pieces on the ground.

RELATED ART OF INVENTION

U.S. Pat. No. 5,133,176 discloses a mulching mower unit including a mower deck supported by a vehicle body, two blades housed in the mower deck, a cylindrical shroud provided for the corresponding blade and including a rotational trajectory of the blade, and a kicker provided in a cutting chamber formed by the cylindrical shroud. The kicker deflects grass clippings, which are pulled by the blade, downward to allow the grass clippings to undergo several cutting operations by the blade to produce finer clippings. While such a mulching mower unit improves the mulching performance, a large amount of grass clippings is always accumulated within the cutting chamber. The large volume of grass clippings falls on the ground as the blade stops rotating and remains as a mass of grass clippings, which may aesthetically mar a view of a mown field.

SUMMARY OF INVENTION

There is a growing demand for providing a mulching mower unit achieving both good mulching performance and good appearance of a mown field.

The present application discloses a mulching mower unit including a mower deck supported by a vehicle body and including a bottom surface facing the ground, a blade fixed to a rotary shaft, a shroud, and a deflector plate. The rotary shaft extends vertically through the bottom surface of the mower deck to be rotatably supported to the mower deck. The shroud has a circumferential wall including a rotational trajectory of the blade and extends downward from the bottom surface of the mower deck to an area adjacent to the blade. The deflector plate is provided above the blade and radially outward of the rotary shaft in an inner space of the shroud (also referred to as "cutting chamber"). The deflector plate includes a main body having an inner edge facing the rotary shaft and an outer edge spaced apart from the inner edge radially outward of the rotary shaft. The outer edge of the deflector plate is positioned closer to the ground than the inner edge of the deflector plate. In one or more embodiments, the deflector plate is arranged rearward from the rotary shaft. In this case, the deflector plate has a front edge facing the rotary shaft, and a rear edge spaced apart from the front edge radially outward of the rotary shaft.

When the deflector plate is arranged rearward from the rotary shaft, a rear half of the cutting chamber (i.e., a part of the cutting chamber rearward from the rotary shaft) has a greater height in a rear region than in a front region adjacent to the rotary shaft. More particularly, a capacity of the rear region is smaller than a capacity of the front region in the rear half of the cutting chamber. As a result, the rear region produces a pressure greater than the front region when the blade rotates. Such a difference in pressure allows grass clippings in the rear half of the cutting chamber to flow from the rear region to the front region and then fall on the ground. This function is achieved regardless in which part of the cutting chamber the deflector plate is placed with respect to the rotary shaft. In any case, the deflector plate satisfactorily reduces the accumulated amount of grass clippings in the cutting chamber compared with an arrangement having no deflector plate. This prevents a large volume of grass clippings from falling on the ground when the blade stops rotating.

In one embodiment, the main body of the deflector plate includes a horizontal part extending horizontally from the rear edge, and a slanting part inclining upward from the horizontal part to the front edge. Such an arrangement allows the rear region of the rear half of the cutting chamber to provide a narrow space defined by the horizontal part and a rotational trajectory plane of the blade with a decreased height. On the other hand, the front region of the rear half of the cutting chamber provides a wider space than the rear region defined by the slanting part and the rotational trajectory plane of the blade with its height gradually increasing toward the rotary shaft. This arrangement smoothly distributes the pressure from the rear region to the front region, which results in smooth flows of grass clippings from the rear region to the front region.

In one embodiment, the rear edge of the deflector plate, i.e., the rear edge of the main body, abuts against the inner surface of the circumferential wall of the shroud to enhance the sealability in the rear region of the rear half of the cutting chamber.

DETAILED DESCRIPTION OF INVENTION

Figure 1:
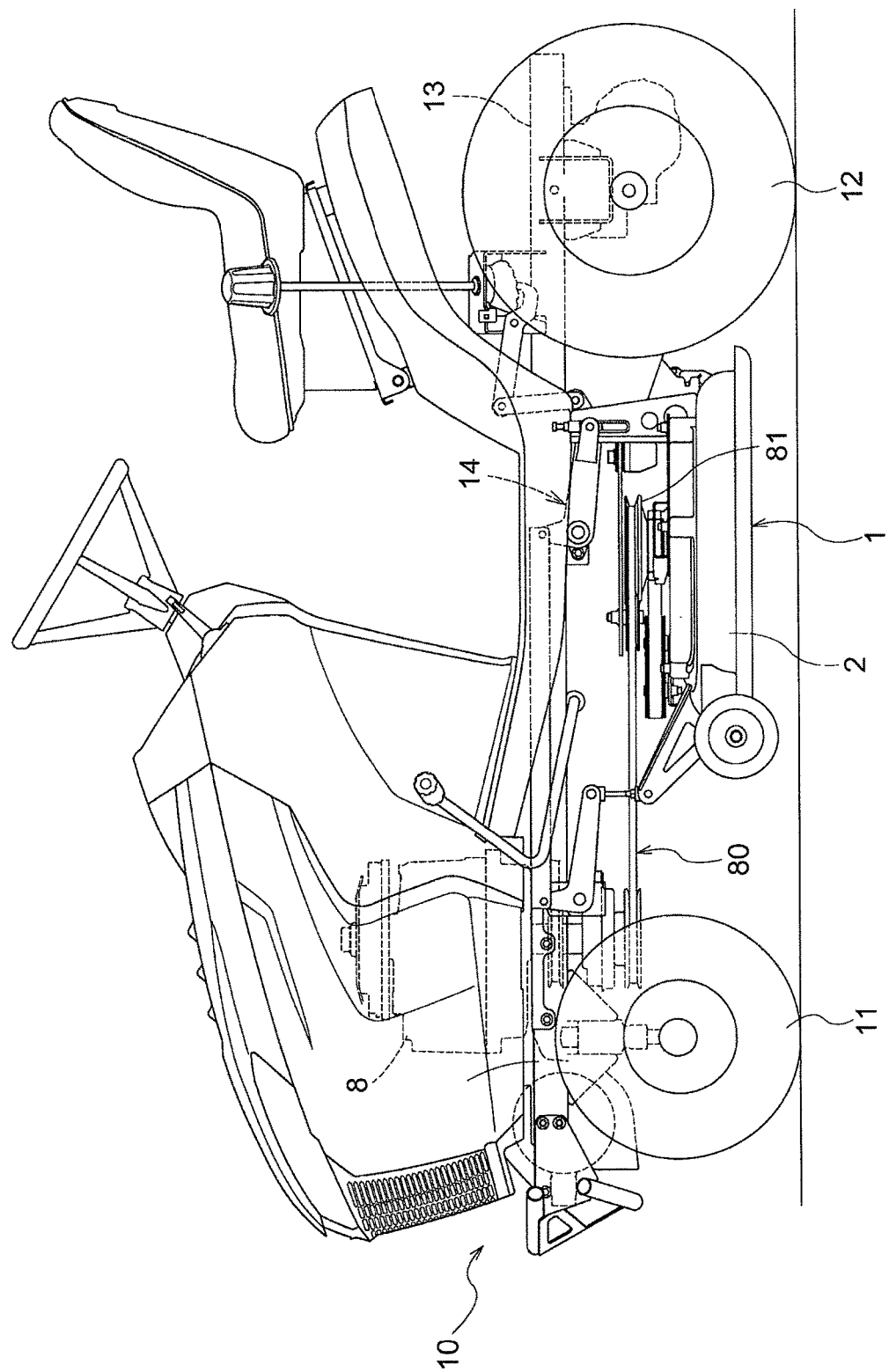
FIG. 1 is a side view of a lawn mower provided with a mulching mower unit.

One of embodiments of a mulching mower unit will be described in detail in reference to the accompanying drawings. Referring to FIG. 1, a lawn mower includes a mulching mower unit 1 provided between front wheels 11 and rear wheels 12, and a vehicle body 10 supported to the ground by the front wheels 11 and the rear wheels 12. The vehicle body 10 includes a pair of right and left rails 13 extending along a center line in a vehicle front-rear direction. An engine 8 is mounted forward of the rails 13 for supplying drive power to the rear wheels 12 and the mulching mower unit 1. The mulching mower unit 1 is supported to the rails 13 via a lift link device 14.

Figure 2:
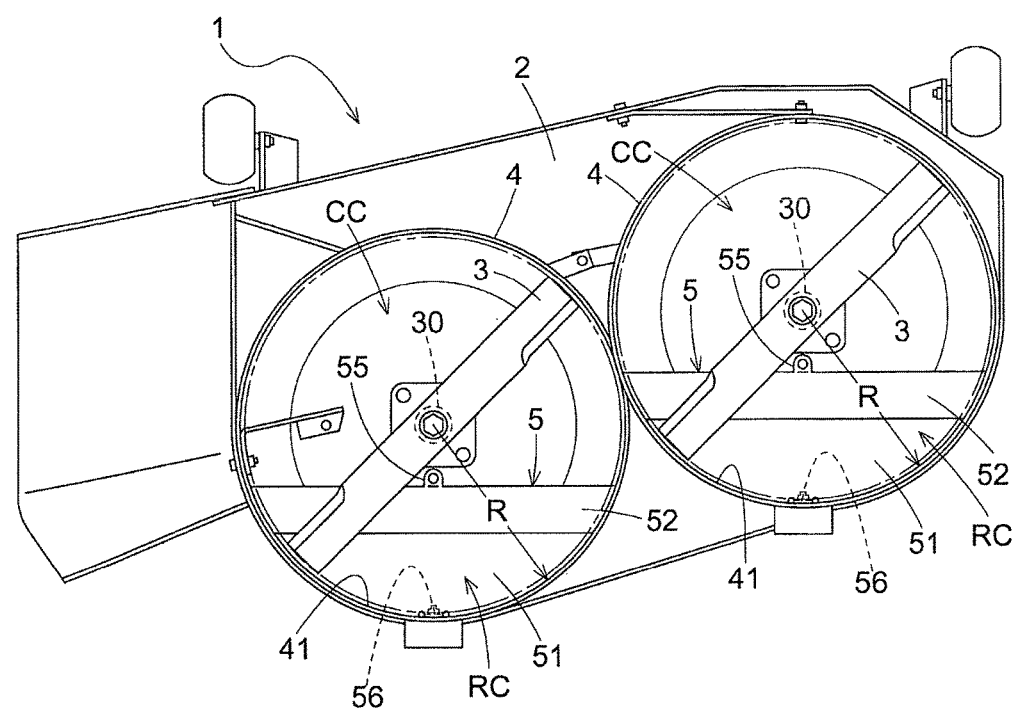
FIG. 2 is a bottom view of a mulching mower unit including two blades.

Referring to FIG. 2, the mulching mower unit 1 includes a mower deck 2, two rotary shafts 30 arranged in a transverse direction of the vehicle body, a blade 3 attached to a lower end of each rotary shaft 30, a shroud 4 for enclosing the blade 3, and a deflector plate 5 arranged within the shroud 4.

The lift link device 14 is connected to the vehicle body 10 at one end and to the mower deck 2 at the other end to raise or lower the mower deck 2 to vary a distance from the mower deck 2 to the ground. The mower deck 2 has a bottom surface 21 facing the ground. The rotary shaft 30 extends through the mower deck 2 to be rotatably supported by a boss 31 extending downward from the bottom surface 21.

The rotary shaft 30 has an upper end projecting upward from the boss 31, and a lower end projecting downward from the boss 31. A pulley 81 of a belt transmission device 80 is fixed to the upper end of the rotary shaft 30 for transmitting engine power. The blade 3 is fixed to the lower end of the rotary shaft 30.

Figure 3:
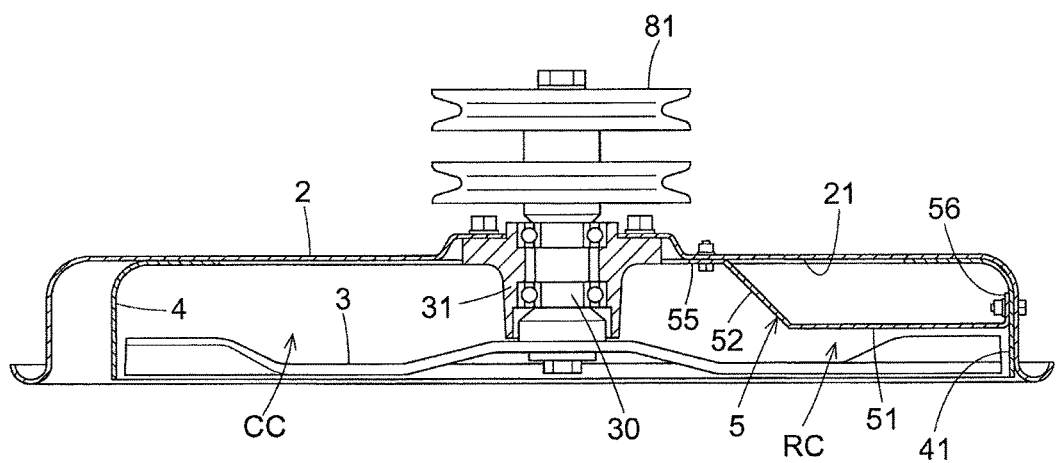
FIG. 3 is a sectional side view of the mulching mower unit showing a cutting chamber.

Referring to FIG. 3, the blade 3 is spaced apart from the bottom surface 21 of the mower deck 2. The shroud 4 is a cylindrical element formed of a plate material with one end being fixed to the bottom surface 21 of the mower deck 2 and with the other end facing the ground. The shroud 4 has a diameter slightly greater than a rotational trajectory of the blade 3, and an axial length greater than a distance from the blade 3 to the bottom surface 21 of the mower deck 2. Thus, the blade 3 is kept in a space delimited by the bottom surface 21 of the mower deck 2 and the shroud 4. The cylindrical space delimited by a rotational trajectory plane of the blade 3, the bottom surface 21 of the mower deck 2, and the shroud 4 forms a cutting chamber CC. Further, a semi-cylindrical rear half (adjacent to the rear wheels of the vehicle body) of the cutting chamber CC forms a rear chamber RC.

Figure 4:
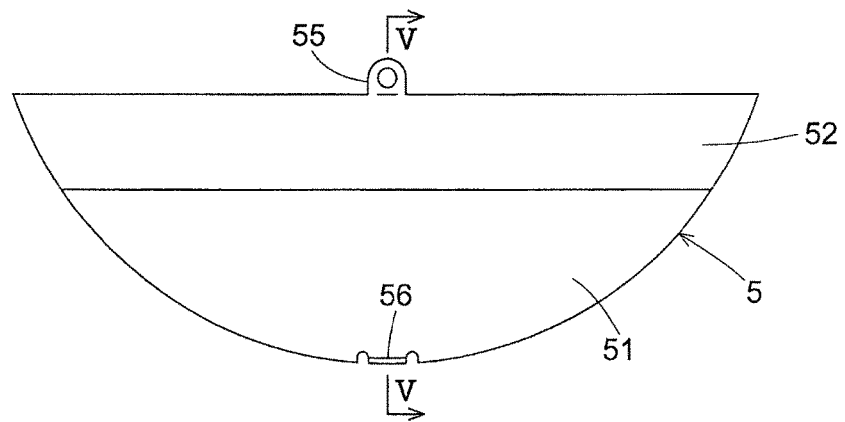
FIG. 4 is a top plan view of a deflector plate.
Figure 5:
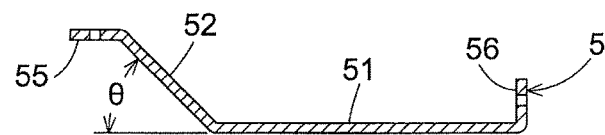
FIG. 5 is a vertical sectional view of the deflector plate.

The deflector plate 5 shown in FIGS. 4 and 5 is arranged within the rear chamber RC. The deflector plate 5 is formed of a plate material and shaped as a segment as viewed from the top with a curvature substantially the same as a curvature of a circumferential inner wall surface 41 of the shroud 4 having a radius R. The deflector plate 5 includes a horizontal segment part 51 and a trapezoidal slanting part 52 with arc opposite sides as viewed from the top. The horizontal part 51 is integrally formed with the slanting part 52 to form a one-piece unit. The deflector plate 5 has a rear edge defined by an arc edge of the horizontal part 51, and a front edge defined by a straight front edge of the slanting part 52. The slanting part 52 inclines relative to the horizontal part 51 by a tilt angle θ of about 45 degrees.

A front flange 55 extending horizontally is provided in a center of the front edge of the slanting part 52. A rear flange 56 extending upward is provided in a center of the arc edge of the horizontal part 51. Both the front flange 55 and the rear flange 56 are plate tang-shaped pieces each having a mounting bore. The front flange 55 is fixedly attached to the bottom surface 21 of the mower deck 2 through a bolt, and the rear flange 56 is fixedly attached to the circumferential inner wall surface 41 of the shroud 4 through a bolt. The deflector plate 5 divides the rear chamber RC into two, an upper part and a lower part. A gap between the horizontal part 51 and the rotational trajectory plane of the blade 3 is narrow, and in one or more embodiments, between several millimeters to several tens of millimeters. A gap between the slanting part 51 and the rotational trajectory plane of the blade 3 becomes gradually greater toward the front and, eventually, substantially coincides with a gap between the bottom surface 21 of the mower deck 2 and the rotational trajectory plane of the blade 3. The arc edge of the deflector plate 5 abuts against the circumferential inner wall surface 41 of the shroud 4. The straight front edge of the deflector plate 5 abuts against the bottom surface 21 of the mower deck 2 adjacent to the boss 31 housing the rotary shaft 30.

In short, the semi-cylindrical rear chamber RC defined in a rear space from the rotary shaft 30 in the cutting chamber CC (rear half of the cutting chamber CC) is divided into the two parts by the deflector plate 5 including the slanting part 52 gradually descending rearward from the rotary shaft 30 (toward the rear wheels of the vehicle body). Such an arrangement facilitates reduction of the amount of grass clippings held in the cutting chamber CC, which results in reduction of the amount of grass clippings falling on the ground when the blade stops rotating.

Figure 6:
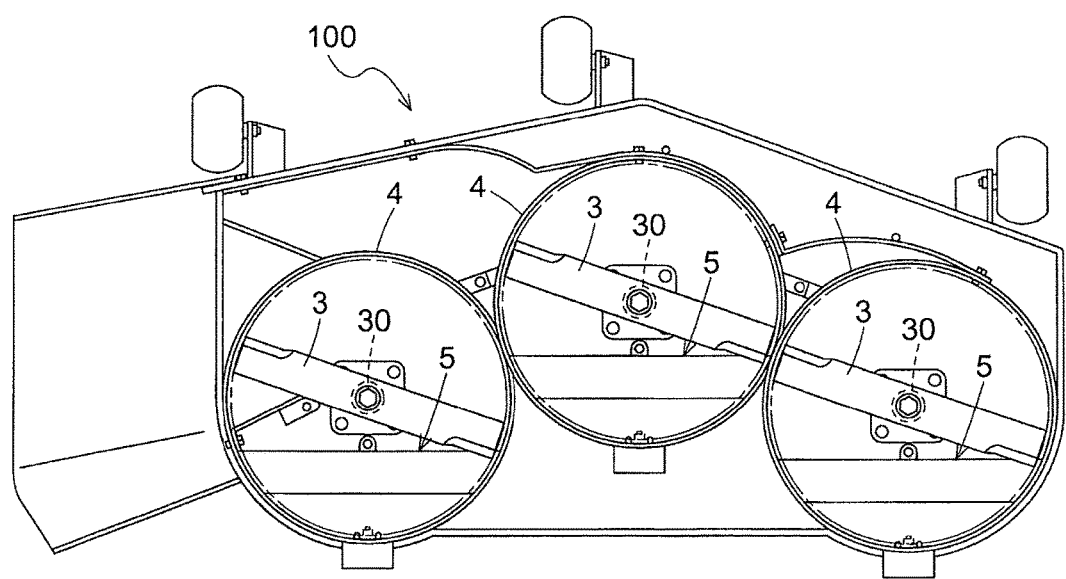
FIG. 6 is a bottom view of a mulching mower unit including three blades.

Referring to FIG. 6, a mulching mower unit 100 has three blades. Three sets of substantially the same elements as shown in FIG. 2, including the rotary shaft 30, blade 3, shroud 4, and deflector plate 5, are arranged in the transverse direction. In this manner, the subject matter disclosed herein is applicable to any types of mulching mower unit regardless of the number of blades.

ALTERNATIVE EMBODIMENTS

[1] In the above embodiment, the deflector plate 5 is fundamentally formed of the horizontal part 51 and the slanting part 52. Additionally, a second horizontal part 51 may be provided forward of the slanting part 52.

[2] In the above embodiment, the slanting part 52 of the deflector plate 5 has a flat inclined surface. The inclined surface may be a stepped inclined surface.

[3] In the above embodiment, the deflector plate 5 is fixed at two mounting points using the front flange 55 and the rear flange 56. The deflector plate 5 may be fixed at three or more mounting points.

[4] In the above embodiment, the tilt angle θ is about 45 degrees. Any tilt angle θ is selectable to hold a proper amount of grass clippings in the cutting chamber CC.

[5] In the above embodiment, the ratio of the longitudinal dimension of the deflector plate 5 to the radius of the rotational trajectory of the blade 3 is about 5:7. This ratio is variable with the size of the boss 31. Any ratio is selectable to hold a proper amount of grass clippings in the cutting chamber CC.

[6] In FIG. 3, the ratio of the maximum longitudinal dimension of the horizontal part 51 to the maximum longitudinal dimension of the slanting part 52 is about 7:2. This ratio is just an example and also variable. Any ratio is selectable to hold a proper amount of grass clippings in the cutting chamber CC.

[7] In the above embodiment the deflector plate 5 is positioned rearward of the rotary shaft 30. The deflector plate 5 may be positioned at any position inside the rotational trajectory of the shroud 4 other than rearward, such as forward, rightward or leftward, of the rotary shaft 30 to disperse the grass clippings properly from the cutting chamber CC.

What is claimed is:
1. A mulching mower unit, comprising:
a mower deck supported by a vehicle body and including a bottom surface facing the ground;
a rotary shaft extending vertically through the bottom surface of the mower deck and rotatably supported to the mower deck;
at least one blade spaced apart from the bottom surface of the mower deck and fixed to the rotary shaft;
a shroud with a circumferential wall including a rotational trajectory of the at least one blade, the shroud extending downward from the bottom surface of the mower deck to an area adjacent to the at least one blade; and
a deflector plate provided above the at least one blade and radially outward of the rotary shaft and in a rear portion of an inner space of the shroud, the deflector plate including a main body having an inner edge facing the rotary shaft and an outer edge spaced apart from the inner edge radially outward of the rotary shaft, the outer edge being positioned closer to the ground than the inner edge, wherein the deflector plate is formed as a solid piece of material and includes a rear edge defined by an arc edge, a front edge defined by a straight front edge of a generally planar slanting part, and arc opposite sides, as viewed from the top.

2. The mulching mower unit according to claim 1, wherein
the deflector plate is arranged rearward from the rotary shaft, and
the inner edge of the main body acts as the front edge facing the rotary shaft, and the outer edge of the main body acts as the rear edge spaced apart from the front edge radially outward of the rotary shaft.

3. The mulching mower unit according to claim 2, wherein the rear edge of the deflector plate has an arc shape along an inner surface of the circumferential wall of the shroud.

4. The mulching mower unit according to claim 3, wherein the rear edge of the deflector plate abuts against the inner surface of the circumferential wall of the shroud.

5. The mulching mower unit according to claim 2, wherein the main body of the deflector plate includes a horizontal part extending horizontally from the rear edge, and the slanting part inclining upward from the horizontal part to the front edge.

6. The mulching mower unit according to claim 5, wherein the slanting part inclines by an angle of about 45 degrees.

7. The mulching mower unit according to claim 2, wherein the deflector plate is formed as a segment complementary to the inner surface of the circumferential wall of the shroud as viewed from the top, and
wherein the main body of the deflector plate includes a horizontal part extending horizontally from the rear edge, and the slanting part inclining upward from the horizontal part to the front edge.

8. The mulching mower unit according to claim 7, wherein
the deflector plate includes a front flange formed at the front edge, a rear flange formed at the rear edge, and the front flange is attached to the bottom surface of the mower deck, and the rear flange is attached to the inner surface of the circumferential wall of the shroud.

9. The mulching mower unit according to claim 1, wherein the at least one blade comprises two or three blades arranged side by side, each blade being associated with the shroud and the deflector plate.

* * * * *